United States Patent
Straw et al.

(10) Patent No.: US 8,853,592 B2
(45) Date of Patent: Oct. 7, 2014

(54) METHOD FOR LASER MACHINING A SAMPLE HAVING A CRYSTALLINE STRUCTURE

(75) Inventors: Marcus Straw, Portland, OR (US); Amin Samsavar, Lake Oswego, OR (US); Milos Toth, Portland, OR (US); Mark Utlaut, Scappoose, OR (US)

(73) Assignee: FEI Company, Hillsboro, OR (US)

( * ) Notice: Subject to any disclaimer, the term of this patent is extended or adjusted under 35 U.S.C. 154(b) by 422 days.

(21) Appl. No.: 13/003,450

(22) PCT Filed: Jul. 9, 2009

(86) PCT No.: PCT/US2009/050135
§ 371 (c)(1),
(2), (4) Date: Jan. 10, 2011

(87) PCT Pub. No.: WO2010/006188
PCT Pub. Date: Jan. 14, 2010

(65) Prior Publication Data
US 2011/0115129 A1    May 19, 2011

Related U.S. Application Data

(60) Provisional application No. 61/079,304, filed on Jul. 9, 2008.

(51) Int. Cl.
*B23K 26/40* (2014.01)
*B23K 26/14* (2014.01)
*B23K 26/08* (2014.01)
*B23K 26/06* (2014.01)
*B23K 26/03* (2006.01)

(52) U.S. Cl.
CPC ........... *B23K 26/03* (2013.01); *B23K 26/14* (2013.01); *B23K 26/0853* (2013.01); *B23K 26/1423* (2013.01); *B23K 26/063* (2013.01)

USPC ..................................... 219/121.69

(58) Field of Classification Search
USPC ....................... 219/121.68, 121.69
See application file for complete search history.

(56) References Cited

U.S. PATENT DOCUMENTS

| | | | |
|---|---|---|---|
| 3,303,319 | A | 2/1967 | Steigerwald |
| 4,874,947 | A | 10/1989 | Ward et al. |

(Continued)

FOREIGN PATENT DOCUMENTS

| | | |
|---|---|---|
| CN | 1125917 | 7/1996 |
| CN | 1406452 | 3/2003 |

(Continued)

OTHER PUBLICATIONS

Garcia-Navarro et al., "Femtosecond laser and swift-ion damage in lithium niobate; A comparative analysis", May 2008, Journal of Applied Physics, vol. 103, 093540-1 to 093540-10.*

(Continued)

*Primary Examiner* — Geoffrey S Evans
(74) *Attorney, Agent, or Firm* — Scheinberg & Associates, PC; Michael O. Scheinberg; John B. Kelly

(57) ABSTRACT

A charged particle beam and a laser beam are used together to micromachine a substrate. A first beam alters the state of a region of the work piece, and the second beam removes material whose state was altered. In one embodiment, an ion beam can create photon absorbing defects to lower the local ablation threshold, allowing the laser beam to remove material in a region defined by the ion beam. The combination of laser beam and charged particle beam allows the creation of features similar in size to the charged particle beam spot size, at milling rates greater than charged particle processing because of the increased energy provided by the laser beam.

26 Claims, 6 Drawing Sheets

(56) References Cited

U.S. PATENT DOCUMENTS

| | | |
|---|---|---|
| 5,024,968 A | 6/1991 | Engelsberg |
| 5,099,557 A | 3/1992 | Engelsberg |
| 5,254,832 A | 10/1993 | Gartner et al. |
| 5,495,107 A * | 2/1996 | Hu et al. .................. 250/281 |
| 5,531,857 A | 7/1996 | Engelsberg et al. |
| 5,643,472 A | 7/1997 | Engelsberg et al. |
| 5,821,175 A | 10/1998 | Engelsberg |
| 5,874,011 A | 2/1999 | Ehrlich |
| 5,958,268 A | 9/1999 | Engelsberg et al. |
| 5,990,027 A | 11/1999 | Mercuri et al. |
| 6,048,588 A | 4/2000 | Engelsberg |
| 6,140,604 A | 10/2000 | Somers et al. |
| 6,281,471 B1 | 8/2001 | Smart |
| 6,335,208 B1 | 1/2002 | Lowry |
| 6,346,352 B1 * | 2/2002 | Hayden et al. ............ 250/492.21 |
| RE37,585 E | 3/2002 | Mourou et al. |
| 6,627,886 B1 | 9/2003 | Shachal et al. |
| 6,727,458 B2 | 4/2004 | Smart |
| 6,770,544 B2 | 8/2004 | Sawada |
| 6,864,457 B1 | 3/2005 | Alexander et al. |
| 6,900,447 B2 * | 5/2005 | Gerlach et al. ............ 250/494.1 |
| 6,956,182 B2 | 10/2005 | Gregory |
| 6,979,822 B1 | 12/2005 | Stewart et al. |
| 7,022,981 B2 | 4/2006 | Smart |
| 7,026,600 B2 | 4/2006 | Jamieson et al. |
| 7,045,791 B2 * | 5/2006 | Benas-Sayag et al. ..... 250/492.3 |
| 7,166,186 B2 | 1/2007 | Lowry |
| 7,253,405 B2 | 8/2007 | Kato |
| 7,288,739 B2 | 10/2007 | Gregory |
| 7,316,936 B2 | 1/2008 | Lowry |
| 7,420,181 B2 | 9/2008 | Kaga et al. |
| 7,504,182 B2 | 3/2009 | Stewart et al. |
| 7,582,848 B2 | 9/2009 | Smart |
| 7,679,030 B2 | 3/2010 | Smart |
| 7,741,701 B2 | 6/2010 | Mahle et al. |
| 7,750,268 B2 | 7/2010 | Smart |
| 7,804,073 B2 | 9/2010 | Kaga et al. |
| 8,143,063 B2 | 3/2012 | Farmer et al. |
| 8,409,524 B2 | 4/2013 | Farmer et al. |
| 2004/0055634 A1 * | 3/2004 | Yamaguchi .................. 83/14 |
| 2004/0175852 A1 * | 9/2004 | Ooi et al. ..................... 438/22 |
| 2005/0003633 A1 * | 1/2005 | Mahle et al. ................. 438/463 |
| 2005/0109747 A1 | 5/2005 | Alexander |
| 2005/0145609 A1 | 7/2005 | Gregory |
| 2005/0146025 A1 | 7/2005 | Gregory |
| 2005/0155957 A1 | 7/2005 | Gregory |
| 2006/0124847 A1 | 6/2006 | Kato |
| 2006/0202130 A1 | 9/2006 | Kollmer et al. |
| 2007/0039933 A1 | 2/2007 | Cheng |
| 2007/0048866 A1 | 3/2007 | Farmer et al. |
| 2007/0210249 A1 | 9/2007 | Alberici |
| 2007/0232033 A1 * | 10/2007 | Wieczorek et al. ........... 438/482 |
| 2007/0257200 A1 * | 11/2007 | Kaga et al. ................ 250/423 R |
| 2007/0278180 A1 | 12/2007 | Williamson et al. |
| 2009/0309018 A1 | 12/2009 | Smith et al. |
| 2011/0163068 A1 | 7/2011 | Utlaut et al. |
| 2012/0103945 A1 | 5/2012 | Straw et al. |

FOREIGN PATENT DOCUMENTS

| | | | |
|---|---|---|---|
| EP | 0544398 | | 10/1992 |
| JP | 62-077195 | | 4/1987 |
| JP | 63-144889 | | 6/1988 |
| JP | 03-038833 | | 2/1991 |
| JP | 05-261577 | | 10/1993 |
| JP | 06-055283 | | 3/1994 |
| JP | 06-099292 | | 4/1994 |
| JP | 7-5677 A | * | 1/1995 |
| JP | 7-090581 A | * | 4/1995 |
| JP | 11-16121 A | * | 1/1999 |
| JP | 2001-071164 | | 3/2001 |
| JP | 2002-175772 | | 6/2002 |
| JP | 2002-175772 A | * | 6/2002 |
| JP | 2003-053570 | | 2/2003 |
| JP | 2004-014309 | | 1/2004 |
| JP | 2005-268224 | | 9/2005 |
| WO | WO9738355 | | 10/1997 |
| WO | 2009089499 | | 7/2009 |
| WO | 2010006067 | | 1/2010 |

OTHER PUBLICATIONS

Bauerle, "Laser Processing and Chemistry", Aug. 31, 2011, Springer, $4^{th}$ edition, pp. 253-255.*

Machine translation of Japan Patent document No. 11-16,121-A, Dec. 2013.*

Epifanov, Alexandre, et al., "Statistical Approach to Theory of Electron-Avalanche Ionization in Solids", IEEE Journal of Quantum Electronics, Oct. 1981, pp. 2023-2026, vol. QE-17, Issue 10.

Joglekar, Ajit P, et al., "Optics at critical intensity: Applications to nanomorphing", Proceedings of the National Academy of Sciences, Apr. 20, 2004, pp. 5856-5861, vol. 101, Issue 16.

Lu, C., et al., "End point detection in ion milling processes by sputter-induced optical emission spectroscopy", Journal of Vacuum Science & Technology A: Vacuum, Surfaces, and Films, Apr. 1984, pp. 481-484, vol. 2, Issue 2.

* cited by examiner

METHOD FOR LASER MACHINING A SAMPLE HAVING A CRYSTALLINE STRUCTURE

This application claims priority from U.S. Provisional Application No. 61/079,304, filed on Jul. 9, 2008, which is hereby incorporated by reference.

TECHNICAL FIELD OF THE INVENTION

The present invention relates to laser micromachining.

BACKGROUND OF THE INVENTION

Removing material from a substrate to form microscopic or nanoscopic structures is referred to as micromachining. Removing material is also referred to as milling or etching. Laser beams and charged particle beams are used for micromachining. Each has advantages and limitations in various applications.

Laser systems use several different mechanisms for micromachining. In some processes, the laser is used to supply heat to a substrate to induce a chemical reaction. The reaction occurs only in the areas where the laser supplies heat, although the heat tends to diffuse to an area larger than the laser beam spot, limiting the resolution of the process. Another mechanism used in laser micromachining is photochemical etching, in which the laser energy is absorbed by individual atoms of the substrate, exciting them into a state in which they can chemically react. Photochemical etching is limited to materials that are photochemically active. Another mechanism used in laser machining is laser ablation, in which energy supplied rapidly to a small volume causes atoms to be expelled from the substrate without heating the substrate. Laser ablation using a fast-pulsed femtosecond laser is described, for example, in U.S. Re. 37,585 to Mourou for "Method for controlling configuration of laser induced breakdown and ablation." Femtosecond laser ablation overcomes some of the limitations of the processes described above.

Charged particle beams include ion beams and electron beams. Ions in a focused beam typically have sufficient momentum to micromachine by physically ejecting material from a surface. Because electrons are much lighter than ions, electron beams are typically limited to removing material by inducing a chemical reaction with an etchant. Ions beams typically are generated by a liquid metal ion source or by a plasma ion source. The spot size of a charged particle beam depends on many factors, including the type of particles and the current in the beam. A beam with low current can typically be focused to a smaller spot and therefore produce a smaller structure than a beam with high current, but a low current beam takes longer to micromachine a structure than a high current beam.

Lasers are typically capable of supplying energy to a substrate at a much higher rate than charged particle beams, and so lasers typically have much higher material removal rates than charged particle beams. The wavelength of lasers, however, is much larger than the wavelength of the charged particles in the charged particle beams. Because the size to which a beam can be focused is limited by the wavelength, the minimum spot size of a laser beam is typically larger than the minimum spot size of a charged particle beam. A. P. Joglekar et al., in "Optics at Critical Intensity: Applications to Nano-morphing," *Proceedings of the National Academy of Science*, vol. 101, no. 16, pp. 5856-5861 (2004) ("Joglekar et al.") shows that features smaller that the wavelength can be achieved using laser pulses shorter than about 10 picoseconds near the critical intensity for ionization. The feature size achievable by Joglekar et al. is still not sufficiently small for many nanotechnology applications.

While a charged particle beam typically has greater resolution than a laser beam and can micromachine an extremely small structure, the beam current is limited and the micromachining operation can be unacceptably slow. Laser micromachining, on the other hand, can be faster, but the resolution is inherently limited by the longer wavelength.

One way to take advantage of both the faster micromachining capability of lasers and the higher precision of charged particle beams is to sequentially process a sample. Sequential processing is described, for example, by M. Paniccia et al. in "Novel Optical Probing and Micromachining Techniques for Silicon Debug of Flip Chip Packaged Microprocessors," *Microelectronic Engineering* 46 (pp. 27-34 1999) ("Paniccia et al."). Paniccia et al. describe a known technique for accessing the active portion of a semiconductor flip chip using laser-induced chemical etching to remove the bulk of material, and then using a charged particle beam for the final, more precise micromachining. A problem with sequential processing is determining when to stop the faster, less precise laser micromachining and begin the more precise charged particle beam processing. If the laser processing is stopped too soon, excess material will remain for removal by the charged particle beam. If the laser processing is stopped too late, the work piece will be damaged. Determining when to stop processing is referred to as "endpointing."

Techniques for determining the end point in charged particle beam processing are known and described, for example, in U.S. Pat. Pub. 2005/0173631 to Ray et al. Such techniques include, for example, applying a varying voltage to the underlying circuit to change the secondary particle emission when the underlying circuit is exposed or nearly exposed. By observing the secondary particle emission, an operator can determine when a feature, such as a buried conductor, is uncovered. Other charged particle beam endpointing processes include, for example, detecting transistor leakage current caused by the charged particles injected by the beam. Laser processing is typically not performed in a vacuum chamber, and so secondary electrons and ions cannot be collected.

In ion beam processing, it is also known to detect photons of a specified frequency emitted from the substrate to determine when the material being impacted by the ion beam has changed. Such a process is described, for example, U.S. Pat. No. 4,874,947 to Ward et al. for "Focused Ion Beam Imaging and Process Control," which is assigned to the assignee of the present application. While Ward et al. describe the detection of photons for endpointing in an ion beam system, this technique is not widely used because the low photon signal is difficult to collect.

SUMMARY OF THE INVENTION

An object of the invention is to improve micromachining by providing advantages to both charged particle processing and laser processing.

A charged particle beam and a laser beam are both applied to the work piece, either simultaneously or sequentially, such that the work piece is altered by one beam, enhancing the processing of the other beam. In one preferred embodiment, a charged particle beam is applied to the work piece to create defects that act as absorption centers for photons, subsequently lowering the ablation threshold locally at the defect site. Embodiments provide speed processing compared to conventional charged particle beam or laser processing, and can produce smaller features than conventional laser processing.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
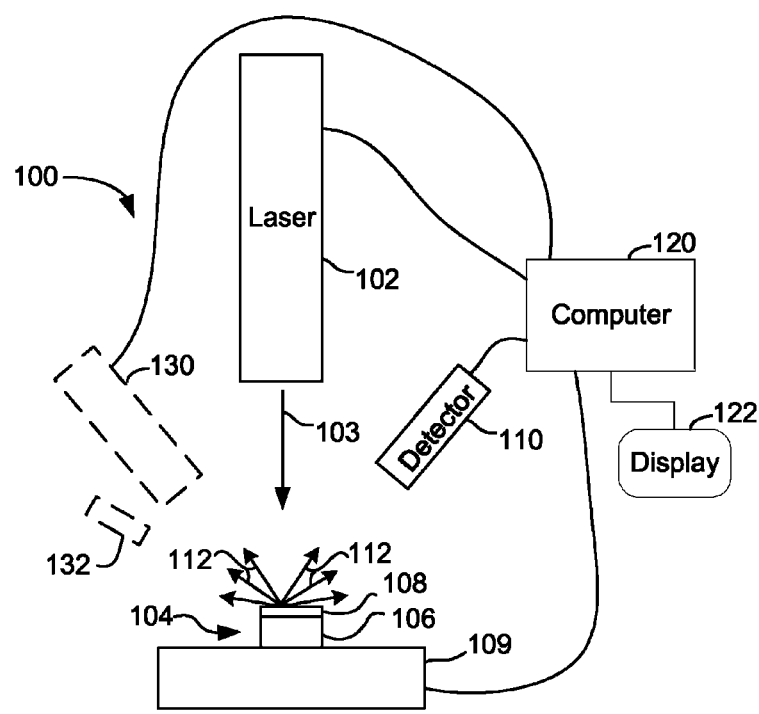
FIG. 1 shows an embodiment of the invention for using emissions from a sample to determine the end point for laser processing.

Various embodiments of the present invention employ various means to enhance laser processing. Embodiments are typically used to micromachine a work piece, also referred to as a sample, which typically entails producing or modifying a structure on the work piece. The structure is typically microscopic, which is used herein to include nanoscopic structures or any structures that are smaller than tens of microns. Embodiments of the invention could use any type of laser, now existing or to be developed, that supplies sufficient fluence. A preferred laser provides a short, that is, nanosecond to femtosecond, pulsed laser beam. Suitable lasers include, for example, a Ti:Sapphire oscillator, a fiber-based laser, or a ytterbium or chromium doped thin disk laser.

Endpointing for Laser Processing

Ablation of a substrate by short, that is, nanosecond to femtosecond, laser pulses is accompanied by various emissions from the substrate. Embodiments of the present invention use the emissions from the substrate to determine the progress of the laser micromachining and to determine when a stage of processing is complete. The emission yields and energy spectra of the emitted particles are material-dependent. When a first material is being removed to expose a second material, the emissions will change at the material interface. A detector can determine when emissions change, indicating a change in material under the beam. When emissions characteristic of the second material are detected or when emissions characteristic of the first layer cease, the operator can know the progress of the laser milling operation. Upon a detected change in emissions, the operator or system can alter the process either automatically or manually, for example, stopping the processing.

Emissions from the sample include luminescence, e.g., from the infrared (IR) to ultraviolet (UV) to x-ray range), electrons, ions, neutral atoms or molecules, and particles/droplets. The different types of emissions are useful for endpointing in different applications, depending on the type of materials being processed and the processing environment. Processing environments can include, for example, normal atmospheric gas at atmospheric pressure; a high vacuum, that is, a pressure of less than about $10^{-3}$ mbar; a vacuum suitable for an environmental scanning electron microscope, such as a pressure of between about 1 mbar and 50 mbar of various gases, or a controlled gas environment of any suitable gas at any suitable pressure. Ions emitted from the surface can be analyzed directly by mass spectrometry to determine when the material ejected from the surface changes, indicating that a boundary has been reached. Systems for secondary ion mass spectroscopy are common accessories for commercial focused ion beam systems. A second, time-delayed laser beam can be coincidentally focused at the evolving emissions, commonly referred to as the plasma plume, in order to ionize neutral atoms and molecules that exist therein. This second beam can originate from a separate, additional laser or it can originate from the same laser as the primary beam through the use of a standard beam splitter. The interval between the arrival of the primary beam and the arrival of the secondary beam (the time-delay) can be adjusted by adjusting the path length of the secondary beam. The ions resulting from this secondary ionization can then be analyzed by mass spectrometry. Particles and droplets can also be analyzed by inductively coupled plasma mass spectrometry.

When luminescence is used for endpointing, it has the advantage of "looking ahead" of the bottom of the milled hole. That is, atoms just below the surface are excited by the laser pulse because the plasma generated by a laser pulse propagates beyond the volume ablated by the pulse. Photons are therefore emitted from just below the surface, which emissions can provide a more timely indicator of when to cease micromachining. That is, when photons from the second material are used as the indicator, they can be detected shortly before the first material is entirely removed. Similarly, photoemissions from the first material begin to decay shortly before the first material is entirely removed. Endpointing can be performed by detecting a current of photons emitted from the surface, the emission being caused by the laser beam, or by a charged particle beam.

When emissions other than photons are used for endpointing, the substrate typically must be maintained in a low-pressure environment or a vacuum, so that air molecules do not interfere with the collection of the emissions. When photons are used as the indicator, the laser can be operating either in a vacuum, at atmospheric pressure, or in controlled gaseous environments.

Detectors may be general detectors that determine the intensity of one or more types of emissions. In general, a detector counts particles (including references) or measures a particle current, and has a characteristic energy response that defines the detector sensitivity as a function of particle energy. A detector output may be differentiated in time to maximize the ability to detect changes in the signal used for endpointing. Multiple detectors may be used in parallel to detect particles of different energy, charge, mass or charge-to-mass ratio. For example, a broadband photon detector, such as a photomultiplier tube or a semiconductor detector, can be used to measure the intensity of light emitted from the substrate. The detector can be optimized to maximize the material dependence of the endpointing signals. For example, an energy filtering spectrometer can be adjusted to detect a specific signal expected from the buried layer or from the covering layer. In some embodiments, a diffraction grating can be used to disperse the light and a slit can be used to pass light within a given frequency band, which can then be detected by a broadband photon detector. In place of the slit, one or more absorption filters can be used that absorb light characteristic of the covering material and transmit light characteristic of the buried material, or vice versa, to provide a signal when the buried material is exposed or nearly exposed. Alternatively, a diffraction grating can be used to disperse the light onto a charge-coupled device array. The emission spectrum is determined by the strength of the signal measured at different cells in the array. The signals measured at different cells can be used to monitor the intensities of characteristic signals emitted from the covering and buried layers.

Various materials, such as metals, semiconductors, and insulators comprise the layers of materials that are being milled or that are underlying the layers being milled For example, common materials include Si, $SiO_2$, Cu, Al, Au, Ag, Cr, Mo, Pt, W, Ta, low k dielectrics, high k dielectrics, $Al_2O_3$, SiC, $Si_3N_4$, GaN, AlN, $Al_xGa_{(1-x)}N$, $In_xGa_{(1-x)}N$, GaAs, $In_xGa_{(1-x)}As$, and Ge. When photons are detected as the endpointing indicator, those photons would typically have a wavelength of between 0.01 nm and 1000 nm, and more typically between 300 nm and 800 nm Suitable detectors, from x-ray detectors for the shorter wavelengths to infrared detectors for the longer wavelengths, can be used. Skilled persons can readily determine the characteristic emission spectra of the various underlying and covering materials Implementing endpointing is easier when the characteristic signals from the cover material and the underlying material are not close in frequency.

When electrons are used as the endpointing indictor, it is preferable to use a type of electron detector that is currently employed in charged particle beam systems, such as dual beam systems, that include an ion beam column and an electron beam column Such detectors include, for example, a high efficiency Everhart-Thornley detector that comprises a scintillator that emits light when impacted by an electron, and a photomultiplier that amplifies the emitted light signal. The Everhart-Thornley detector is typically mounted off the laser axis and a voltage relative to the sample is applied to a screen in front of the scintillator to attract electrons emitted by the sample. To exclude electrons below a specified energy level, the sample can be biased to prevent the collection of low energy electrons. The electrons being detected typically have energies of less than about 20 eV, although electrons having energies of up to 1,000 eV may be useful in some applications. In some embodiments, the electrons within a broad energy band are collected with the electron current being characteristic of the substrate material. In other embodiments, the energy of the electrons is determined to characterize the material.

In some embodiments, rather than detecting particles emitted from the sample surface in the vacuum chamber, the current from the sample to ground can be measured. The ground is physically contacted to sample whether directly, for example, through probe, or indirectly, for example, through the sample stage. The current flowing to or from ground is equal to the current leaving the surface of the sample surface under impact from the beam.

FIG. 1 shows a preferred system 100 embodying the present invention. A laser 102 producing a beam 103 is typically operated at a fluence above the threshold for the material being machined. For example, Mourou teaches a preferred beam having energy in the range of 10 nJ to 1 mJ, and a fluence in the range of 0.1 $J/cm^2$ to 100 $J/cm^2$. In one embodiment, a laser beam has an energy of 30 nJ and a fluence of 0.4 $J/cm^2$. The beam 103 is directed to a sample 104, which may include a substrate material 106 and a covering material 108. The sample 104 will typically have several layers of different materials. Sample 104 is typically positioned on a two-axis precision X-Y stage 109 (additional axes may include translation normal to the first two axes, tilt and rotation). A detector 110 detects emissions 112 from the sample 104. The emissions 112 change as the covering material 108 is removed and the substrate material 106 is uncovered. A computer 120 receives a signal from detector 110 and a change in signal indicates that the material under the beam has changed, allowing an operator to monitor the machining progress and take appropriate action or allowing the system to automatically take action, such as automatically stopping laser 102 from further processing. A display 122 connected to computer 120 can provide information to the operator, including an image of the sample 104. As described above, the detector may detect photons, electrons, ions, neutral particles, or droplets that are emitted as a result of the laser ablation or other laser process. System 100 optionally includes one or more charged particle beam columns 130, such as an electron beam column, an ion beam column, or both, which can be used for processing or imaging, as well as a secondary electron detector 132 for forming an image of the sample 104. When charged particle beam column 130 or secondary electron detector 132 are used, the substrate is maintained in a vacuum. In some embodiments, detector 110 can be used to detect a secondary electron signal to form an image, as well as detecting the endpointing signal.

Figure 2:
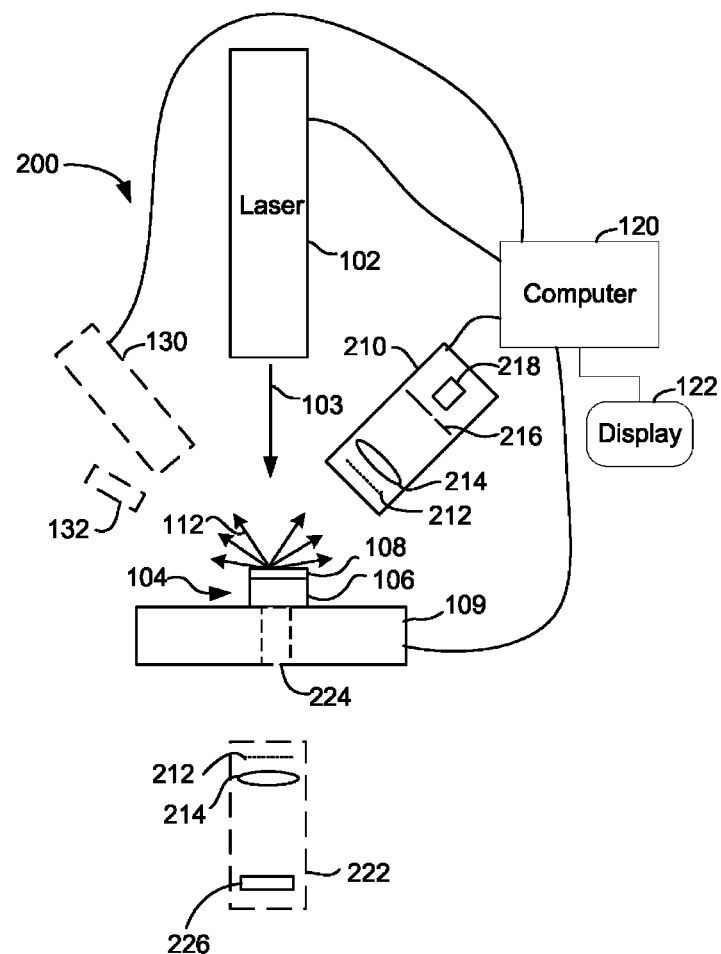
FIG. 2 shows an embodiment of the invention for using photons emitted from the sample to determine the end point for laser processing.

FIG. 2 shows a system 200 in which the detector comprises a photon detector 210, which includes a monochromator, shown schematically as a diffraction grating 212, or alternatively, a prism, that disperses the light from the sample 104, a lens 214 that focuses the dispersed light at different points depending on the frequency, a slit 216 that passes light having a spectrum characteristic of the underlying material, and a photon detector 218 for detecting the light that passes through slit 216. Computer 120 receives the signal from photon detector 210, which signal is interpreted to determine when the material under the laser beam has changed. Computer 120 can, for example, provide a signal to an operator or automatically stops laser 102 from further processing when a change in emissions indicates that a stage of processing is complete. An alternative photon detector 222 is shown positioned under the substrate. Such positioning of the photon detector is useful only when the substrate is transparent to the characteristic light signal, that is, when the band gap of the substrate material is greater than the energy of the photons being detected. When a photon detector below the sample is used, the stage includes a gap or a transparent window 224 for transmitting light. Instead of using a slit and a photomultiplier tube, photon detector 222 is a broad spectrum detector that includes an array 226 of charge-coupled devices (CCDs) that detect the strength of the light signal at different positions that correspond to different frequencies. Either type of detector can be used in either position.

Figure 3:
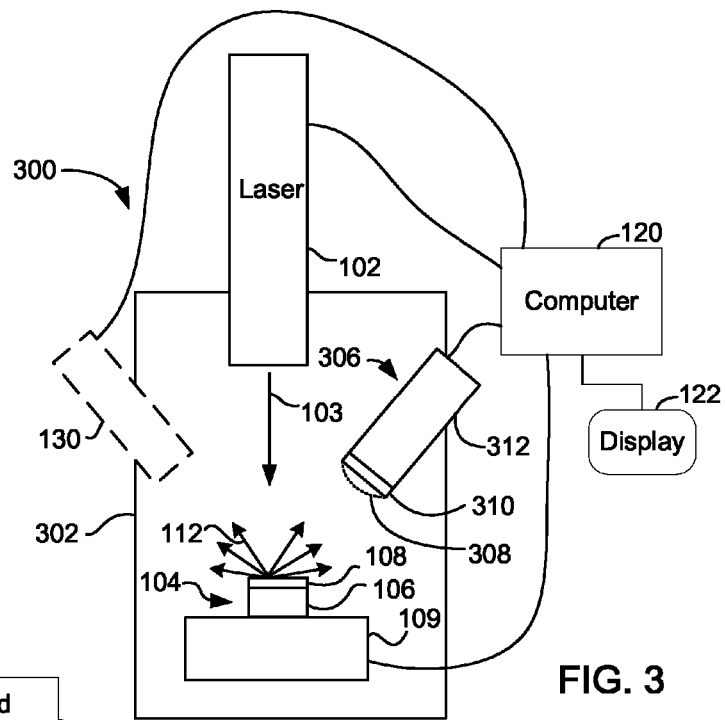
FIG. 3 shows an embodiment of the invention using electrons emitted from the sample to determine the end point for laser processing.

FIG. 3 shows a system 300 for laser processing that detects electrons to determine an end point. In system 300, substrate 104 is positioned in a vacuum chamber 302. An electron detector 306 is an Everhart-Thornley detector including a screen 308, a scintillator 310 and a photomultiplier 312. A low voltage of about 50 volts is applied to the screen 308 and a high voltage of about 10,000 V is applied to the scintillator. Electrons are accelerated from the sample to the screen, and are then accelerated to greater energy to cause the emission of photons in the scintillator. Those photons are converted to electrons and are multiplied in the photomultiplier tube.

Figure 4:
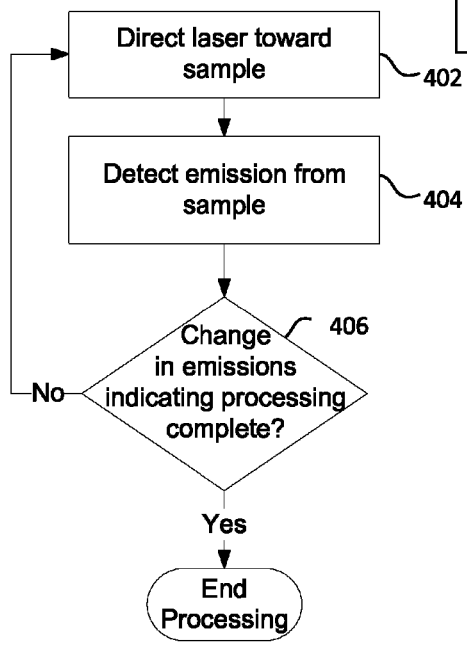
FIG. 4 is a flow chart showing the preferred steps in accordance with an embodiment of the invention for determining the end point for laser processing.

FIG. 4 is a flow chart that shows the operation of the system of FIG. 1. In step 402, the laser is directed toward the substrate. In step 404, emissions from the substrate are detected. In decision block 406, it is determined whether a change in the emissions indicates that the laser micromachining has cut through, or nearly cut through, the covering material. If a change in the emissions indicates that the laser micromachining has cut through, or nearly cut through, the covering material, then the process is altered. If not, the process continues with step 402. Altering the process means, for example, stopping the laser beam, changing a laser parameter, such as the fluence per pulse, changing a gas flow, blanking an electron or an ion beam, or moving a stage that supports the sample. Emissions can be monitored continuously or periodically. If emissions are monitored periodically, the period should be sufficiently small to prevent unacceptable damage to the underlying material if the covering material is completely removed between monitoring periods.

In some embodiments, a charged particle beam, such as an electron beam, can be used to generate an endpointing signal for laser micromachining The electron beam could be, for example, coincident with the laser beam during laser ablation and used concurrently or sequentially with the laser beam. If cathodoluminescence or backscattered electrons are used as the endpointing signal, the electron beam energy can be adjusted to tune the "look-ahead" capability of the endpointing.

Dual Beam Processing

As described for example, in Mourou, femtosecond pulsed lasers can provide high rates of material removal with relatively little concomitant damage to the substrate locally by providing a fluence above the ablation threshold. The minimum feature size, however, is limited. In the embodiments described below, a charged particle beam and a laser beam are used for micromachining a sample. One beam alters the state of a region of the sample surface to facilitate material removal of material by the other beam. Altering the state can include, for example, generating defects including implanted impurities, with high cross-sections for photon absorption. The term "state" is used in a general sense to mean the collection of properties characterizing the sample region. Preferred embodiments combine the laser beam's advantage of rapid processing with the charged particle beam's advantage of small spot size. Thus, embodiments can micromachine or deposit material more rapidly than a charged particle beam alone, and with greater precision than a laser beam alone.

In some embodiments, the laser beam fluence is sufficiently low so that, in the absence of a charged particle beam, the laser beam would not induce ablation in the material of the work piece. For example, the charged particle beam can be used to generate defects or impurities in a small volume. The defects or impurities absorb photons, reducing the local ablation threshold to facilitate local processing by the laser beam, which removes material affected by the ion beam. Because the charged particle beam can typically be focused to a much smaller spot than the laser beam, these embodiments take advantage of both the small spot size of the ion beam and the more rapid removal of the laser. That is, the laser ablates material in the area affected by the charged particle beam, but essentially does not ablate material in other areas. Thus, the size of the ablated area is determined by the spot size of the ion beam, while the speed of material removal is increased by the greater energy supplied to the substrate by the laser. In some embodiments, the removal rate is limited by the rate at which the charged particle beam can create photon-absorbing defects.

In other embodiments, the FIB sputter rate is increased by using the incident laser beam to provide energy (heat) to the work piece such that melting of the substrate does not necessarily occur due to the non-existent or only weak coupling between the incoming photons and substrate phonons. This allows incoming ions to deposit a greater fraction of their energy to removing quasi-melted substrate atoms. Adjusting the pulse width and fluence of the femtosecond laser beam incident on the sample such that it is just below the melt threshold, a focused ion beam is made to be coincident near the peak of the laser beam's intensity profile. The energy provided by the ion beam can then sputter substrate material at enhanced rates with little loss of spatial locality (see FIG. 1). The result is an increased sputter yield and sputter rate producing features with sizes on the order of the size of the ion beam.

In various embodiments, the laser and charged particle beams may impact the sample at the same time or the beams may impact at different times. Either beam can be applied continuously or can be pulsed. In one embodiment, for example, multiple laser pulses can be applied as the charged particle beam irradiates the work piece. In another embodiment, multiple charged particle beam pulses can be applied as the laser irradiates the work piece. In some embodiments, both beams are continuously applied, and in other embodiments, pulses of the laser beam and the charged particle beams are applied alternately.

In a pulsed laser, the power is adjusted by adjusting the pulse width and fluence of the femtosecond laser beam incident on the sample such that it is just below the ablation threshold of the unaltered material, and the peak of the laser beam's intensity profile is coincident with a focused ion beam impact area. A continuous wave laser could also be adjusted to provide the appropriate power. The laser beam will then be absorbed primarily in the region to which the ion beam was directed. The laser is preferably applied in a manner such that the energy in excess of that which causes ablation of the altered area is insufficient to melt the work piece material.

If the beams impact at different times, the effect of the laser and charged particle beams on the state of the work piece material subject to processing is cumulative, that is, the localized effect of one beam is still present when the other beam is directed. For example, if a charged particle beam such as a 30 keV Ga$^+$ beam is used to generate photon-absorbing defects, such as vacancies, interstitials, defect complexes, or implanted gallium in the work piece, then the ion and laser beams may be pulsed sequentially, an ion pulse preceding a laser pulse, and the delay time between the ion pulse and the laser pulse can be relatively long, because the defects and impurities are relatively stable.

A cumulative effect is in contrast to the sequential processing in the prior art, in which a laser beam is applied for a bulk removal process, followed by the application of a charged particle beam for a second, fine removal process. In such prior art sequential processing, each beam processes the work piece independently, and neither beam alters the substrate material in a manner that facilitates the processing by the subsequent beam. While the first prior art beam operation at completion may leave a small affected volume near the surface, the first beam operation does not have a significant effect on the operation of the subsequent beam operation. In the prior art, the affected volume of the first beam is small compared to the volume machined by the subsequent beam operation.

Figure 5:
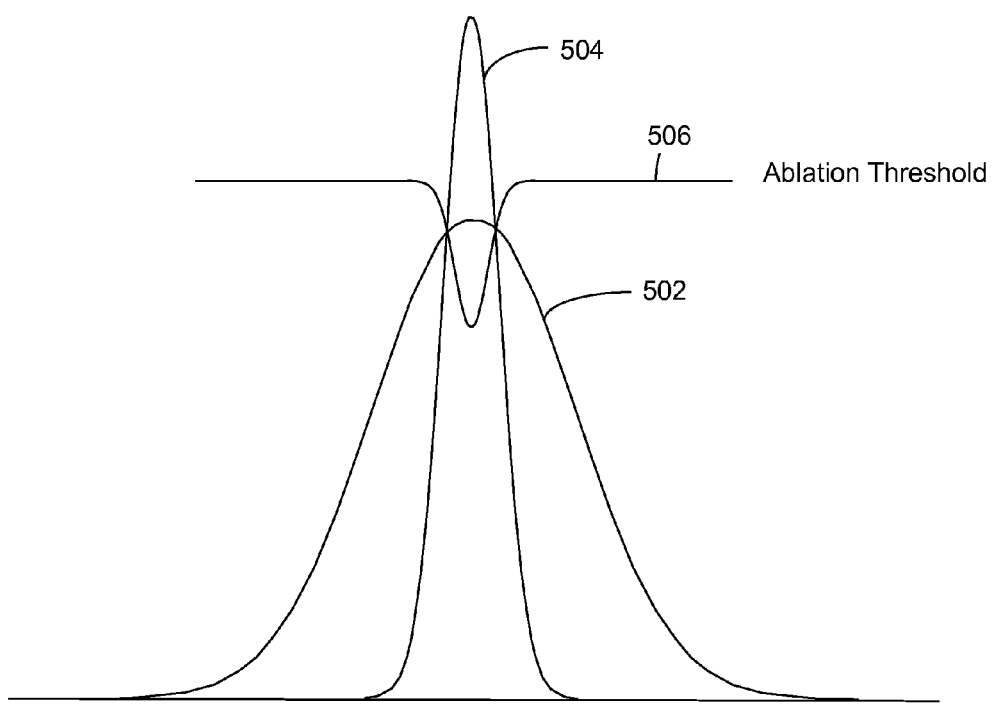
FIG. 5 shows the effect of defects on ablation threshold and the relative sizes of a charged particle beam and a laser beam.

FIG. 5 shows a laser beam intensity profile 502, which is relatively broad, and the current distribution 504 of an ion beam, which is relatively narrow. Line 506 shows the ablation threshold, which dips below the laser beam fluence where the state of the surface material was altered by the ion beam processing. Thus, the laser beam ablates material only in regions where the ion beam has lowered the ablation threshold. The combination of the laser beam and ion beam results in a removal rate that is faster than the rate achievable by the ion beam alone, while producing a feature size that is smaller than that achievable by the laser beam alone. The ablation threshold is an intrinsic property of the substrate material, and skilled persons can readily determine empirically or from the literature the ablation threshold for various materials. Silicon, for example, without ion-beam induced defects has a single pulse ablation threshold is about 170 mJ/cm$^2$, and so the laser fluence should preferably be below this value for micromachining silicon in accordance with this embodiment of the invention.

Figure 6:
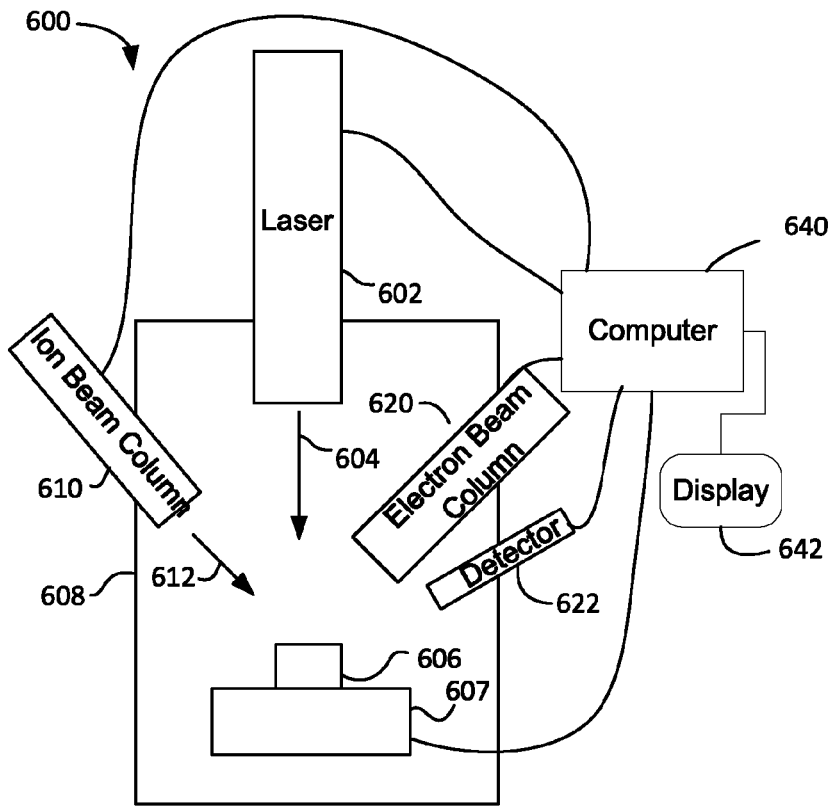
FIG. 6 shows a preferred system for applying a laser beam and a charged particle beam to a sample.

FIG. 6 shows a system 600 in which a laser system 602 directs a laser beam 604 towards a work piece 606 maintained on a two-axis X-Y adjustable stage 607 in a vacuum chamber 608 (additional axes may include translation normal to the first two axes, tilt and rotation). A focused ion beam column 610 directs a focused beam 612 of ions towards the region of the substrate. The ion beam is typically capable of being focused to a smaller spot than the laser beam. The ion beam preferably originates from a liquid metal ion source. Such sources can be single element sources, such as Ga, In, Bi, Sn, and Li, or alloy sources, such as AuSiBe and AsPdB. A plasma ion source can also be used. Plasma sources can provide a wider assortment of species for the charged particle beam. Inductively coupled, magnetically enhanced ion sources are preferred because their low energy spread facilitates forming a small spot ion beam spot at the sample. The ion beam from a liquid metal ion source may be focused to a spot size of less than 100 nm, whereas the laser beam 604 may be focused to a spot size of between 1 μm and 10 μm. The ion beam typically has an energy of up to about 50 keV and operates with an ion current of up to 60 nA. In one preferred embodiment for milling Si, the ion beam has a current of 1 nA, an energy of 30 keV, and a spot size of about 45 nm, whereas the laser beam has a fluence of 100 mJ/cm$^2$, a pulse width of 150 fs, and a spot size of 2 μm. An optional electron beam column 620 is used to form images of a portion of work piece 606 and for other electron beam processing. A secondary electron detector 622 is used to detect electrons emitted from the substrate to form an ion beam or an electron beam image. A computer 640 controls the operation of the system 600 either manually through operator commands or automatically, and includes a display 642 that can provide an image of the substrate and operating controls and options for the operator.

Figure 7:
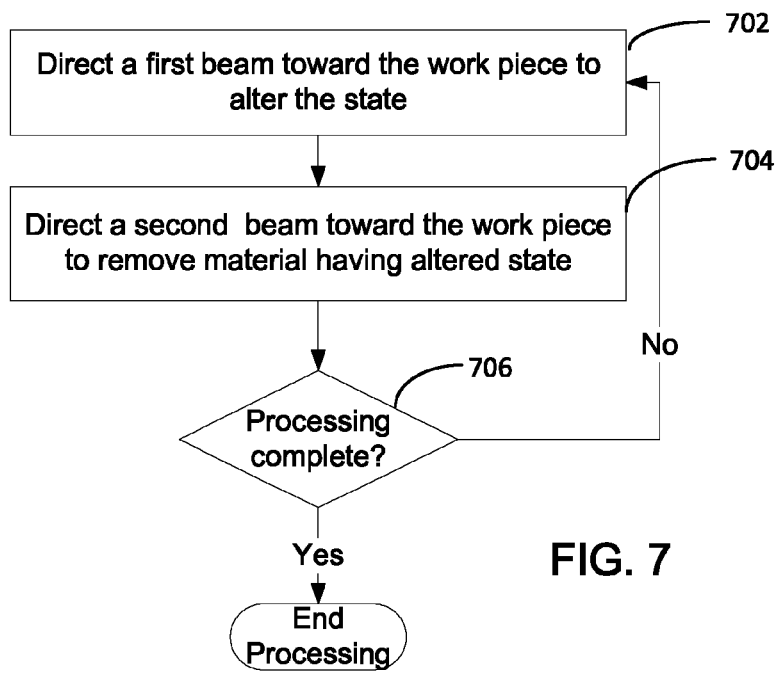
FIG. 7 is a flow chart showing the preferred steps of embodiment of the invention in which two beams are applied to a sample.

FIG. 7 is a flow chart showing a preferred method in accordance with the invention. In step 702, a first beam, either a charged particle beam or a laser beam, is directed to a region of the work piece to alter the state of material affect by the beam. For example, an ion beam, such as a 30 kV gallium beam with a current of 1 nA, can be directed to the surface of a work piece to induced defect, including vacancies, interstitials, and implanted gallium, which absorb photons and locally lower the ablation threshold of the substrate material. In step 704, a second beam, different from the first beam, is directed toward the sample at an area that includes the area to which the first beam was directed. For example, if the first beam was an ion beam, the second beam may be a laser beam. Preferably, the laser beam is incident near the peak intensity of the ion beam. The Steps 702 and 704 can be performed simultaneously, or sequentially. If done sequentially, the steps should be performed sufficiently near in time so that the altered state induced by one beam is still present when the other beam is applied. In an embodiment in which the ion beam is used to induce effects, the time delay between application of the beams is not critical, because the defects are stable. In decision block 706, it is determined whether or not the micromachining is completed. The determination of whether a process is complete can be determined, for example, by using any of the endpointing techniques described above. For example, if a hole is to be milled, step 706 determines whether the hole is sufficiently deep. If micromachining is complete, the process ends. If micromachining is not complete, the process continues with step 702.

Damage Prevention Via Charge Separation

Figure 8:
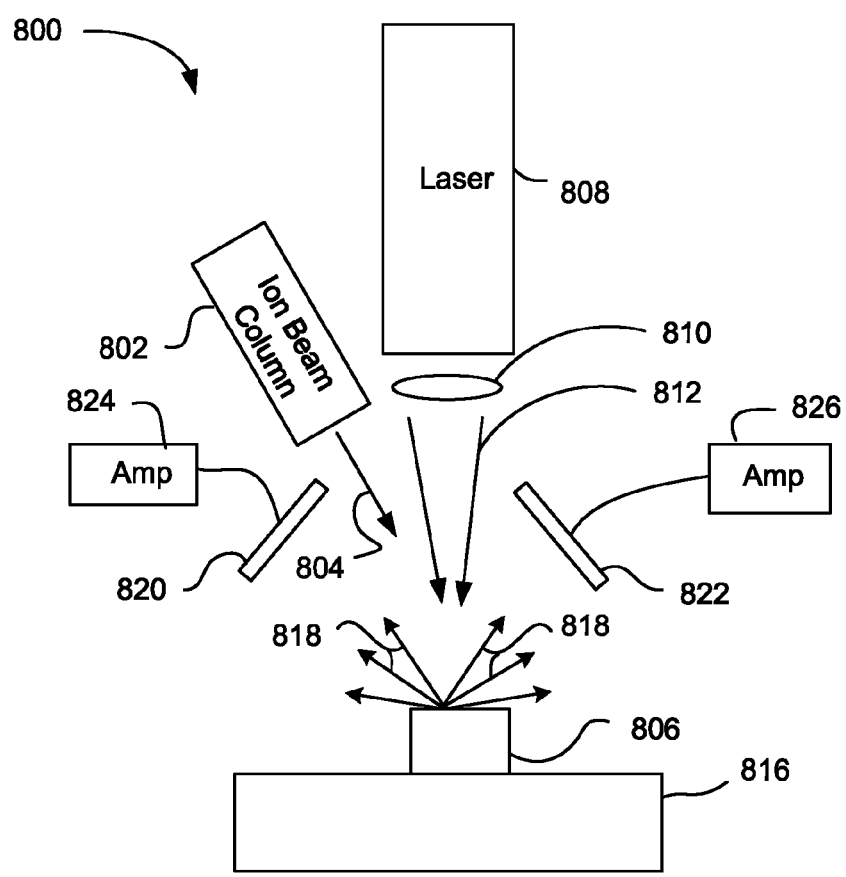
FIG. 8 shows an embodiment that reduces damage to components, such as laser lenses, from secondary particles.

When materials are ejected from a substrate surface, the ejected particles can degrade the optical quality of the laser lens by depositing on the lens or sputtering material from the lens. FIG. 8 shows a system that can reduce damage from secondary particles to a laser lens and other components in the vacuum system. FIG. 8 shows a system 800 that includes a charged particle beam column 802, such as a focused ion beam column, that directs a charged particle beam 804 toward a sample 806. System 800 also includes a laser system 808 having a lens 810 that focuses laser beam 812 onto the sample 806. The laser system 808 and the charged particle beam 804 are preferably coincident, that is, they impinge on the same area of the sample 806, with the laser beam typically having a larger spot size on sample 806 than the charged particle beam. While the laser system 808 is shown having a vertical orientation and the charged particle beam 802 is shown being tilted with respect to the vertical, both systems can be oriented in any suitable orientation.

Sample 806 rests on a precision movable stage 816. When charged particle beam 804 impacts sample 806, secondary particles 818, including electrons and ions, are emitted. The ions can impact on laser lens 810 and reduce its optical quality. Electrodes 820 and 822 are connected to a voltage source (not shown) to create an electric field that deflects the path of secondary particles 818 away from the laser lens 810 to reduce or eliminate damage. The electrodes 820 and 822 can also be used to detect secondary particles 818 for imaging or end pointing. An amplifier 824 can be connected to electrode 820 to amplify the secondary electron signal. Additionally or alternatively, an amplifier 826 can be connected to an electrode 822 to amplify the positive ion signal for imaging or endpointing.

In a preferred embodiment, an electrical potential of about 300 V to 400 V is applied between electrode 820 and electrode 822. The preferred voltage will vary with the implementation, but will typically be in the range of between a few tens of volts to a few thousands of volts, with a range of a few hundred volts preferred. The shape of the electrode 820 and 822 can be varied to shape the electric field to redirect particles the ions impacting the laser lenses or other components above the sample. In some embodiments, a single electrode could be used. In some embodiments, a magnetic field could be used in place of electrodes 820 to deflect charged particles away from sensitive components.

According to preferred embodiments of the present invention, a structure is produced or modified on a sample by:
  directing an ion beam toward a first region of a work piece, the charged particles inducing photon-absorbing defects in the crystal structure of the work piece that lower the ablation threshold of the work piece material; and
  directing a laser beam toward the work piece, the laser photons being absorbed by the defects created by the ion beam to ablate material on the work piece that was processed by the ion beam.

According to preferred embodiments of the present invention, directing an ion beam toward a first region of a work piece includes implanting ions into the work piece. The ions are generated by a liquid metal ion source (LMIS), by a metal alloy source, or by an inductively coupled plasma source.

According to preferred embodiments of the present invention, directing an ion beam toward a first region of a work piece includes implanting gallium ions in to the surface of the work piece or generating vacancies, interstitials or defect complexes. Other examples of LMIS may include In, Bi, Sn, Li and examples of alloy sources may include AuSiBe, AsPdB.

According to preferred embodiments of the present invention, the ion and laser beams are pulsed sequentially.

According to preferred embodiments of the present invention, directing of a laser beam toward the work piece includes directing a laser beam having a fluence sufficient to ablate material having charged particle beam-induced defects, but insufficient to ablate material without charged particle beam-induced defects. For example, the directing a laser beam toward a sample may include directing a pulsed laser having a pulse duration of less than a nanosecond, or less than a picosecond, toward the sample.

According to preferred embodiments of the present invention, directing a laser beam toward a sample includes directing a laser beam toward a sample in an environment having a pressure of less than 10-3 mbar.

According to preferred embodiments of the present invention, the charged particle beam and the pulses from the laser impinge alternately on the sample.

According to preferred embodiments of the present invention, directing one of a laser beam toward a region of a sample includes applying a continuous particle beam toward the sample and in which directing the laser beam or the charged particle beam toward the region of a sample includes directing a continuous laser beam toward the sample.

According to preferred embodiments of the present invention, directing a charged particle beam toward a subset of the region on the sample includes directing the charged particle beam to an area coincident or nearly coincident with the peak of the laser beam's intensity profile, directing the charged particle beam concurrently with directing the laser beam, and/or directing a beam of charged particles to reduce the ablation threshold of the material.

According to preferred embodiments of the present invention, a structure is produced or modified on a sample using a charged particle beam and a laser beam by:
  directing one of a charged particle beam or a laser beam toward the work piece, the one of the charged particle beam or the laser beam altering the state of material on the work piece impacted by the beam;
  directing the other of the charged particle beam or the laser beam toward the work piece, the other beam removing material having an altered state from the work piece.

According to preferred embodiments of the present invention, directing one of a charged particle beam or a laser beam toward the work piece includes directing an ion beam toward the work piece, the ion beam inducing defects in the work piece, and directing the other of the charged particle beam or a laser beam toward the work piece includes directing a laser beam toward the work piece.

According to preferred embodiments of the present invention, the ion beam induces photon-absorbing defects in the work piece.

According to preferred embodiments of the present invention, the ion beam reduces the ablation threshold where the ion beam impacts the work piece.

According to preferred embodiments of the present invention, directing one of a charged particle beam or a laser beam toward the work piece includes directing a laser beam toward the work piece and directing the other of the charged particle beam or a laser beam toward the work piece includes directing a charged particle beam toward the work piece.

According to preferred embodiments of the present invention, the laser beam lowers the sublimation energy of the work piece.

According to preferred embodiments of the present invention, directing one of a charged particle beam or a laser beam toward the work piece or directing the other of the charged particle beam or a laser beam toward the work piece includes directing an ion beam toward the work piece or directing an electron beam toward the work piece.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method of producing or modifying a structure on a sample, comprising:
  directing an ion beam toward a first region of a sample having a crystalline structure, the charged particles inducing photon-absorbing defects in the crystal structure of the sample so that the photon-absorbing defects in the crystal structure lower the ablation threshold of the sample material; and
  directing a laser beam toward the sample, the laser photons being absorbed by the defects created by the ion beam to ablate an area of material on the sample that was processed by the ion beam, the size of the ablated area being determined by the spot size of the ion beam, and wherein the laser beam has a fluence sufficient to ablate material having charged particle beam-induced defects, but insufficient to ablate material without charged particle beam-induced defects.

2. The method of claim 1 in which directing an ion beam toward a first region of a sample includes generating vacancies, interstitials or defect complexes.

3. The method of claim 1 in which the ion and laser beams are pulsed sequentially.

4. The method of claim 1 in which directing a laser beam toward a sample includes directing a laser beam toward a sample in an environment having a pressure of less than $10^{-3}$ mbar.

5. The method of claim 1 in which directing one of a laser beam toward a region of a sample includes applying a continuous particle beam toward the sample and in which directing the laser beam or the charged particle beam toward the region of a sample includes directing a continuous laser beam toward the sample.

6. The method of claim 1, in which directing a charged particle beam toward a subset of the region on the sample includes directing the charged particle beam concurrently with directing the laser beam.

7. The method of claim 1 in which directing an ion beam toward a first region of a sample includes directing an ion beam toward semiconductor silicon.

8. The method of claim 1 in which directing an ion beam toward a first region of a sample comprises directing the ion beam toward a non-transparent region.

9. The method of claim 1 in which directing a laser beam toward a sample includes directing a pulsed laser having a pulse duration of less than a nanosecond toward the sample.

10. The method of claim 9 in which directing a laser beam toward a sample includes directing a pulsed laser having a pulse duration of less than a picosecond toward the sample.

11. The method of claim 1 in which the charged particle beam and the pulses from the laser impinge alternately on the sample.

12. The method of claim 11, in which directing a charged particle beam toward a subset of the region on the sample includes directing the charged particle beam to an area coincident or nearly coincident with the peak of the laser beam's intensity profile.

13. The method of claim 11, in which directing a charged particle beam toward a subset of the region on the sample includes directing a beam of charged particles to reduce the ablation threshold of the material.

14. The method of claim 1 in which directing an ion beam toward a first region of a sample includes implanting ions into the sample.

15. The method of claim 14 in which the ions are generated by a metal alloy source.

16. The method of claim 14 in which the ions are generated by an inductively coupled plasma source.

17. The method of claim 14 in which the ions are generated by a liquid metal ion source (LMIS).

18. The method of claim 17 in which directing an ion beam toward a first region of a sample includes implanting gallium ions in to the surface of the sample.

19. A method of producing or modifying a structure on a sample using a charged particle beam and a laser beam, comprising:
   directing one of a charged particle beam or a laser beam toward the sample having a crystalline structure, the one of the charged particle beam or the laser beam altering the state of material by creating photon-absorbing defects on the sample impacted by the beam, wherein the photon-absorbing defects lower the ablation threshold of the sample;
   directing the other of the charged particle beam or the laser beam toward the sample, the other beam removing an area of material having an altered state from the sample, the size of the removed area of material being determined by the spot size of the one of the charged particle beam or the laser beam, and wherein the other of the charged particle beam or the laser beam has a fluence sufficient to ablate material having photon-absorbing defects, but insufficient to ablate material without photon-absorbing defects.

20. The method of claim 19 in which the ion beam reduces the ablation threshold where the ion beam impacts the sample.

21. The method of claim 19 in which directing one of a charged particle beam or a laser beam toward the sample or directing the other of the charged particle beam or a laser beam toward the sample includes directing an ion beam toward the sample.

22. The method of claim 19 in which directing one of a charged particle beam or a laser beam toward the sample or directing the other of the charged particle beam or a laser beam toward the sample includes directing an electron beam toward the sample.

23. The method of claim 19 in which directing one of a charged particle beam or a laser beam toward the sample includes directing an ion beam toward the sample, the ion beam inducing defects in the sample, and in which directing the other of the charged particle beam or a laser beam toward the sample includes directing a laser beam toward the sample.

24. The method of claim 23 in which the ion beam induces photon-absorbing defects in the sample.

25. The method of claim 19 in which directing one of a charged particle beam or a laser beam toward the sample includes directing a laser beam toward the sample and in which directing the other of the charged particle beam or a laser beam toward the sample includes directing a charged particle beam toward the sample.

26. The method of claim 25 in which the laser beam lowers the sublimation energy of the sample.

* * * * *